H. A. KIRCHER.
TRIPOD.
APPLICATION FILED APR. 17, 1909.
937,612.
Patented Oct. 19, 1909.
2 SHEETS—SHEET 2.
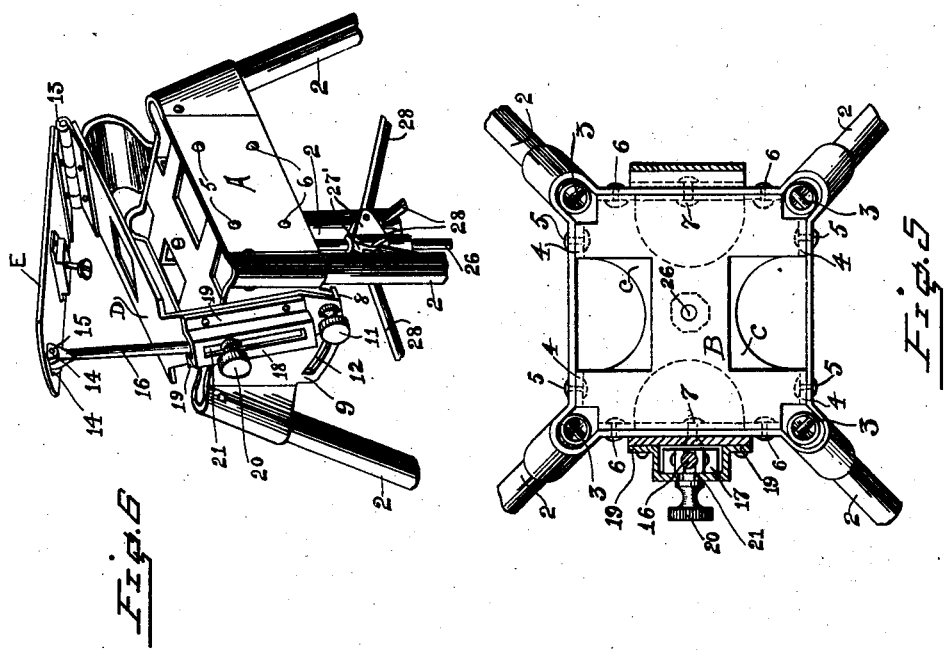
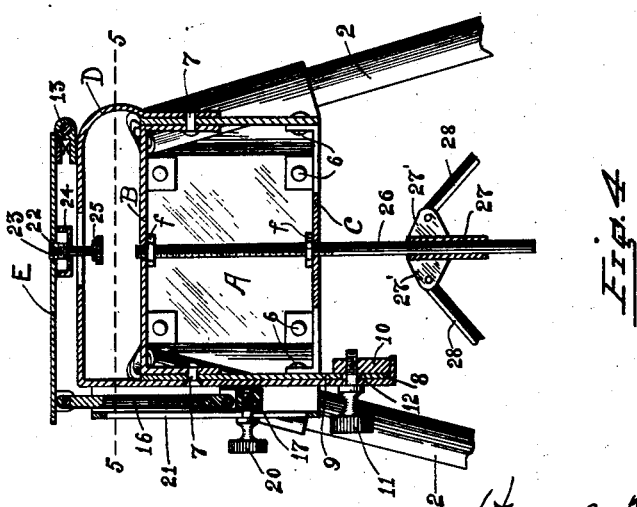

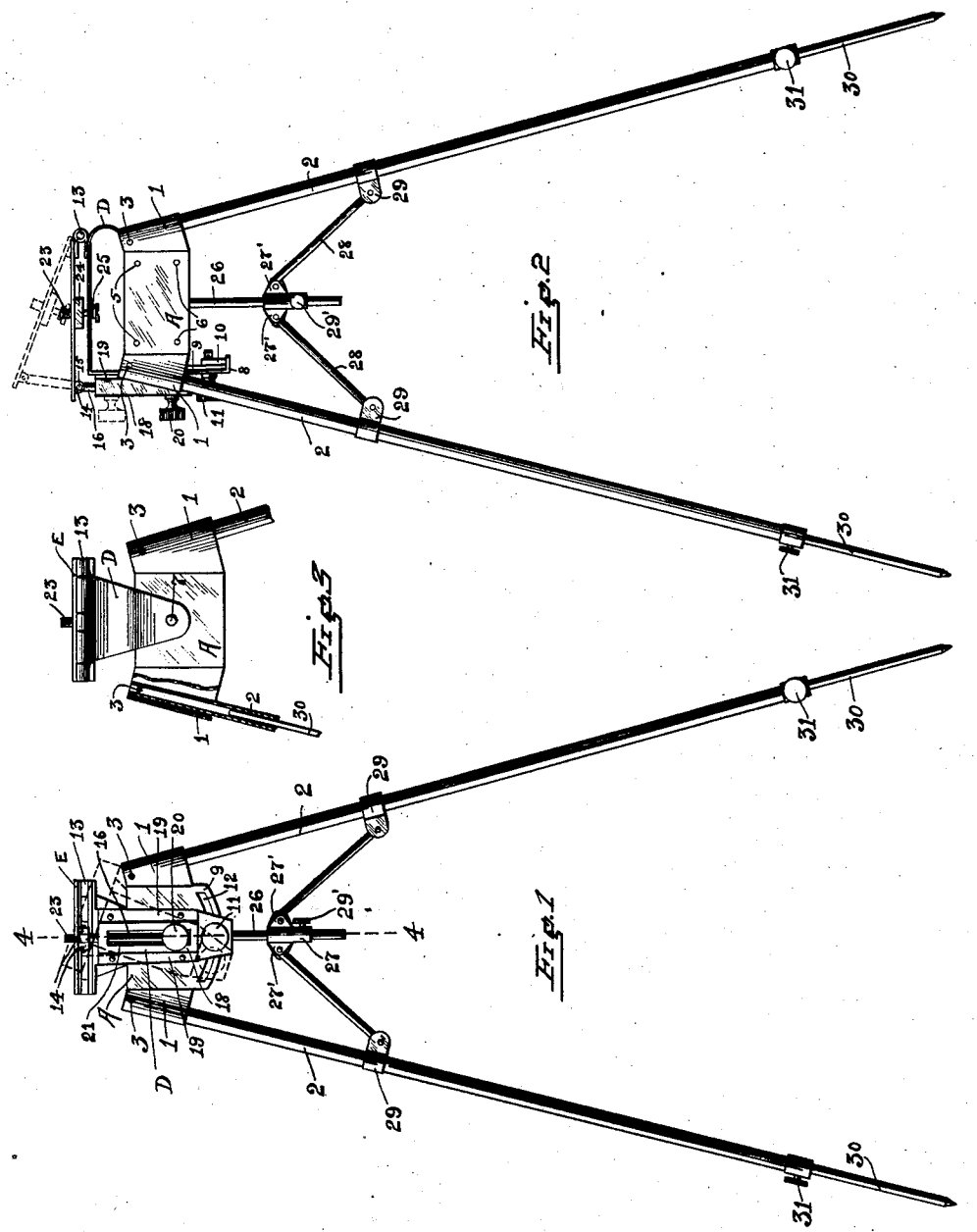

UNITED STATES PATENT OFFICE.

HENRY A. KIRCHER, OF CHEROKEE, IOWA.

TRIPOD.

937,612.  Specification of Letters Patent.  Patented Oct. 19, 1909.

Application filed April 17, 1909. Serial No. 490,548.

*To all whom it may concern:*

Be it known that I, HENRY A. KIRCHER, citizen of the United States, residing at Cherokee, in the county of Cherokee and State of Iowa, have invented certain new and useful Improvements in Tripods, of which the following is a specification.

My invention relates to tripods of that type employed in conjunction with cameras, and more particularly to that class in which the head or member to which the camera is attached, when in use, is capable of being adjusted in both a vertical and lateral direction in planes at right angles to each other to bring the object of which a likeness is to be taken in the proper position in the field of vision without altering the position of the legs of the tripod or disturbing the focus.

The invention further relates to tripods in which a bracing device is employed in order to hold the legs thereof firmly and rigidly in position.

The objects of my invention are to provide first, an improved arrangement and construction of parts for regulating the positions of the camera upon its vertical and lateral axes, and secondly, to provide a suitable bracing means for the legs of the tripod by virtue of which the same may be at all times firmly and substantially supported. I attain these objects in a manner fully pointed out in the following specification, and as illustrated by the accompanying drawings, in which like numerals and letters refer to like parts throughout the several views.

Figure 1, is a front elevation of the tripod showing in dotted lines the movement of the laterally adjustable member. Fig. 2, is a side elevation of the tripod showing the movement of the vertically adjustable member in dotted lines. Fig. 3, is a fragmentary view of the tripod frame, showing the pivotal connection of the laterally adjustable member. Fig. 4, is a fragmentary vertical sectional view taken on the line 4—4 of Fig. 1. Fig. 5, is a horizontal sectional view taken on the line 5—5 of Fig. 4. Fig. 6, is a perspective view of tripod head, and its movable members.

In the embodiment illustrated A represents the frame which is rectilinear in shape and has formed at its corners the radially extending looped member 1, 1, in which are pivotally supported the legs 2, 2, by means of the bolts or rivets 3, 3, thus allowing for the free movement of the legs toward or away from the center of the frame.

Referring to Figs. 4 and 5, B is a plate which is supported flush with the top of frame A and has portions cut away in order to decrease the weight of the same, thus forming the arms 4, 4, which are bent downwardly at right angles and are held firmly in connection with the frame A, by means of the rivets 5, 5. The lower plate C, which like plate B is of spider form also has portions cut away thereby forming arms similar to those of the upper plate B, these arms being securely fastened to the frame A by means of rivets 6, 6, which are so placed that the bottom of the plate C is disposed flush with the bottom edges of the frame A.

Pivotally supported upon the frame A by means of the rivets 7, 7, which form an axis of rotation is the laterally swingable member D, to which is hingedly connected the vertically swingable plate E. The front end of the swingable member D, is disposed at right angles to the top thereof, and has formed at its lower extremity an inwardly extending right angular bend 8, which swings about the slotted and arc-shaped extension 9, which depends from one end of the frame A, and is engaged by a lock nut 10, which receives the thumb screw 11, through the slot 12 in the extension 9, thus enabling the member D to be firmly clamped at any desired angle within the scope of the slot. The top plate of the laterally swingable member D is formed at its rear end with an outwardly projecting curve, at the termination of which, depends the rear pivoted arm of the said member D, disposed at right angles to the top plate thereof. The vertically swingable member E has pivotal movement upon the member D through the medium of the hinge 13, which is fastened to the said member of means of rivets or in any other suitable manner. The outer and under portion of the swingable member E is provided with depending ears 14, 14, and a pin 15, which adapts it to receive in pivotal connection the adjustable supporting rod 16, which carries in pivotal relation at its lower end the block 17. Securely fastened to the front of the laterally swingable member D, by means of integral flanges 19, 19, is the guide or runway 18, which receives in slidable engagement the pivoted block 17, of rod 16, the same being adjustable in the length of the runway and adapted to be clamped at any desired point within the scope of the runway by means of the thumb screw 20, which passes through and plays within the slot 21.

The top plate E is provided at its approximate center with a perforation 22, through which passes a screw 23, used for the purpose of securing a camera or other suitable instrument upon the top of the said plate E. The box shaped formation 24, around the shank of the screw 23, is suitably secured to the plate E by means of rivets or otherwise, and serves as a retainer for the said screw 23, when the same is not in use by engagement with the shoulder formed by the screw threaded part, and also offers a bearing for the head 25, of the screw 23, when the same is in clamping position.

The vertically disposed shaft 26, the threaded portion of which extends through perforations in the plates B and C is securely fastened thereto by means of the nuts $f, f$. The lower extension of the shaft 26, has slidably mounted thereon a winged adjusting sleeve 27, which carries upon its winged extensions 27', 27', pivotally connected rods 28, 28, which in conjunction with the sleeves 29, 29, upon the legs of the tripod, serves to firmly brace the said legs against movement. The thumb screw 29' is threaded into the shank of the adjusting sleeve 27, and when clamped prevents movement of the same.

The legs 2, 2, of the tripod are tubular in form and inclose rods 30, 30, which are of the same length as the legs and are adapted to be slid into or out of the legs 2, 2, clamping screws 31, 31, being provided for securing the said rods at any desired position.

In operating the tripod, the screws 31, 31, are first loosened, thus allowing the rods 30, 30, to be extended to any desired position after which the screws 31, 31, are securely fastened in such adjusted position. The legs are then spread radially until their upper portions come to rest within the looped corners 1, 1, of the frame A, the winged sleeve 27 which in the meantime has moved upon the shaft 26 is then clamped against further movement by means of the screw 29', thus the tripod is substantially and very rigidly supported. The camera or other instrument is then secured to the plate E by means of the screw 23 after which the same may be tilted to any desired angle within the limits of movements of the swingable members D and E. For instance, if it is desired to swing a camera to the right the laterally swingable member D may be moved by slightly loosening the thumb screw 11, after which the said member may be clamped by retightening the thumb screw. The vertically swingable member E is caused to be moved and adjusted by means of the rod 16, in coöperation with the screw 20, and the block 17, in a manner similar to the above described member D.

It is evident that more or less slight changes might be resorted to in the form, arrangement and construction of the several elements combined without departing from the spirit and scope of the invention. I therefore do not wish to be limited to the exact construction as herein set forth.

Having thus fully described my invention what I claim as new and useful and desire to secure by Letters Patent, is:

1. In a tripod the combination with a frame having pivoted legs, of pivoted members mounted on said frame, with horizontal axes at right angles to each other and means for securing said members in any desired position.

2. In a tripod, the combination with a frame having internal radial looped members, of legs pivotally mounted therein and adapted to have their outward movement limited by engagement with the outer parts of said looped members and slidable means for bracing the said legs against movement.

3. In a tripod, the combination with a frame having pivoted legs, of pivoted members mounted on said frame with horizontal axes at right angles to each other, slidable means for regulating the swing of said members and means for clamping the members against movement.

4. In a tripod, a frame, a plate at the top and a plate at the bottom of said frame, arms carried by each plate having their free extremities turned toward the center of and rigidly secured to said frame, said frame at one end thereof being formed with a depending extension provided with an arc-shaped slot, a member pivotally secured at one end to said frame, the other end of said member being turned downwardly, means carried by said last named end of the member and projecting in said arc-shaped slot whereby said member may be clamped to said frame extension, a second member hinged at one end to the rear end of the top of said first member, a rod pivotally connected to the free end of said second member, a guide secured to the downwardly turned end of said first member, said rod of the second member being slidably received in said guide, and means for securing the free end of said rod to said guide.

5. In a tripod, a frame, a member having each of its ends turned downwardly and having one of said ends pivotally secured to one end of said frame, means whereby the other end of said member may be adjustably connected to an opposite end of said frame, a second member having one end thereof hingedly connected to one end of the top of said first member, a depending supporting rod pivotally connected to the free end of said second member, and means whereby said rod at its lower end is adjustably secured to the last named end of the first member.

6. In a tripod, a frame having integral radial looped members, legs pivotally mounted therein, a plate at the top and a plate at the bottom of said frame, arms formed on each plate having their free extremities turned toward the center of and rigidly secured to said frame, a rod secured to each of said plates and depending from the lower plate, a winged sleeve slidably and adjustably mounted upon said rod, a plurality of rods pivotally mounted in the winged extensions of said sleeve, and a plurality of flanged collars supported upon the legs of the tripod connected to the second named rods.

7. In a tripod, a frame, legs mounted therein, a depending arc-shaped slotted flange formed with the lower edge of said frame, a swingable member pivotally mounted upon said frame, the front end of the swingable member being turned downwardly and disposed at right angles to the top thereof, an inwardly bent flange formed at the lower end of the said front arm, a nut carried by the said inwardly bent flange, and a screw received by said nut through the above named slot.

In testimony whereof I affix my signature, in presence of two witnesses.

HENRY A. KIRCHER.

Witnesses:
E. C. HERRICK,
W. K. HERRICK.